United States Patent [19]
Yanagidate

[11] Patent Number: 5,610,884
[45] Date of Patent: Mar. 11, 1997

[54] OPTICAL INFORMATION REPRODUCING APPARATUS FOR DETECTING TRACK CROSSING DIRECTION AND TRACK CROSSING NUMBER FROM REFLECTED LIGHT EXTENDING OVER A PLURALITY OF TRACKS

[75] Inventor: Masaharu Yanagidate, Sagamihara, Japan

[73] Assignee: Olympus Optical Co., Ltd., Tokyo, Japan

[21] Appl. No.: 361,160

[22] Filed: Dec. 21, 1994

Related U.S. Application Data

[63] Continuation of Ser. No. 878,980, May 6, 1992, abandoned.

[30] Foreign Application Priority Data

May 9, 1991 [JP] Japan ................................. 3-104381

[51] Int. Cl.⁶ .................................................. G11B 7/00
[52] U.S. Cl. .......................... 369/44.28; 369/32; 235/454
[58] Field of Search ................................. 369/44.28, 32, 369/44.34, 44.32, 44.11, 44.29; 360/78.04–78.06; 235/475, 476, 477, 454, 480

[56] References Cited

U.S. PATENT DOCUMENTS

| | | | |
|---|---|---|---|
| 4,660,191 | 4/1987 | Maeda et al. | 369/44.41 |
| 4,742,218 | 5/1988 | Nakamura et al. | 369/44.42 |
| 4,855,981 | 8/1989 | Kimura et al. | 235/454 |
| 4,901,299 | 2/1990 | Nakatsu | 369/44.28 |
| 4,924,199 | 5/1990 | Hashimoto et al. | 235/456 |
| 5,027,337 | 6/1991 | Takahashi et al. | 369/44.41 |
| 5,121,375 | 6/1992 | Kuribayashi | 369/44.26 |
| 5,179,268 | 1/1993 | Nitto et al. | 235/454 |
| 5,179,545 | 1/1993 | Tanaka et al. | 369/44.29 |
| 5,195,071 | 3/1993 | Funato et al. | 369/44.37 |

FOREIGN PATENT DOCUMENTS

| | | | |
|---|---|---|---|
| 0270357 | 6/1988 | European Pat. Off. | 369/44.34 |
| 0384358 | 8/1990 | European Pat. Off. | 369/112 |
| 2-21054 | 5/1990 | Japan . | |

*Primary Examiner*—Thang V. Tran
*Attorney, Agent, or Firm*—Armstrong, Westerman, Hattori, McLeland & Naughton

[57] ABSTRACT

An optical information reproducing apparatus has an optical detector consisting of at least two light detecting elements receiving reflected light reflected from a beam spot portion extending over a plurality of tracks on an optical recording medium in which a plurality of tracks are provided parallel with each other. Two signals having different phases are produced in accordance with a direction in which the beam spot crosses a track based on the output of this optical detector, so that a track crossing direction is detected without being affected by dust or the like. Also, the number of crossing tracks is detected.

22 Claims, 14 Drawing Sheets

(OPTICAL HEAD 8, A AND B PHASE OUTPUT AT MOVING IN THE T-DIRECTION)

OPTICAL INFORMATION REPRODUCING APPARATUS FOR DETECTING TRACK CROSSING DIRECTION AND TRACK CROSSING NUMBER FROM REFLECTED LIGHT EXTENDING OVER A PLURALITY OF TRACKS

This application is a continuation of application Ser. No. 07/878,980 filed May 6, 1992, now abandoned.

BACKGROUND OF THE INVENTION

Field of the Invention and Prior Art Statement

The present invention relates to an information reproducing apparatus which is capable of reproducing information quickly even when dust sticks to the apparatus.

In recent years, the amount of information processed by a computer or the like has increased, therefore, an optical information recording/reproducing apparatus which is capable of recording and/or reproducing information with high density using a light beam has been given attention.

In such an information recording and/or reproducing apparatus, as known by Japanese Patent Laid Open No. 2-21054/1990, the number of tracks on which a beam spot crosses and the crossing direction were detected from a reproducing signal and a tracking servo signal obtained by irradiating the beam spot on an information recording medium for reproducing information recorded on a track and other beam spots for obtaining the tracking servo signal.

Recently, several kinds of portable type large capacity memory, such as a so-called optical card on which an optical recording medium is added and a pocket notebook in which an optical recording medium is added has been developed. With the development, an information recording and/or reproducing apparatus has been also developed.

When the optical recording and/or reproducing medium is used as a portable type large capacity memory, it is not avoidable that the medium is stuck by dust or scratched while it is carried.

If there is dust or a scratch, the reflection of a beam spot is disturbed, so that the quantity of light entering a light detector which receives reflected light from a light recording medium has been different from a normal condition. Therefore, it is difficult to detect an accurate number of crossing tracks and the crossing direction. For example, we are apt to make a counting error of a crossing track number. Thereby, in an accessing method in which a beam spot is moved to an objective track based on the crossing track number and crossing direction, it takes a long time to gain access to an objective track to be reproduced. As a result, it has been difficult to reproduce recorded information quickly.

SUMMARY OF THE INVENTION

An object of the present invention is to provide a information reproducing apparatus which is capable of detecting an accurate number of crossing tracks and a crossing direction even if the apparatus is stuck by dust or scratched.

Another object of this invention is to provide an information reproducing apparatus which is capable of reproducing information quickly even if the apparatus is stuck by dust or scratched.

According to this invention, in an information recording and/or reproducing apparatus provided with an optical head irradiating a beam spot extending over the plurality of tracks of the information recording medium and detecting a signal recorded on the tracks from reflected light reflected from the information recording medium, detecting means for detecting the number of the tracks crossed by the beam spot, and moving means for moving and controlling the optical head in accordance with the output from the detecting means, the detecting means detects the number of tracks crossed by the beam spot and the crossing direction from the change in the quantity of reflected light from a plurality of ranges in the beam spot.

BRIEF DESCRIPTION OF THE DRAWINGS

FIGS. 1 to 10 relate to a first embodiment of the present invention;

FIG. 1 shows the structure of an optical card in the first embodiment;

FIG. 2 is a block diagram showing the whole structure of the first embodiment;

FIG. 3 is an explanatory diagram showing a portion of an optical system in the first embodiment;

FIG. 4(*a–b*) are explanatory diagrams showing a relation between a beam spot irradiating the optical card and a read and tracking detector receiving reflected light from the optical card;

FIG. 5 is an explanatory diagram showing a relation among a moire detector, a slit for producing moire and reflected light from the optical card;

FIG. 6(*a–b*) are characteristic diagrams showing the output of the moire detector when a light beam moves;

FIG. 7 is an operation explanatory diagram of a focus controlling circuit;

FIG. 8 is a block diagram showing the structure of the focus controlling circuit;

FIG. 9 is a block diagram showing the structure of a tracking controlling circuit;

FIG. 10 is an explanatory diagram showing the output of an Ap detector in a seek operation;

FIGS. 11 to 18 relate to a second embodiment of the invention;

FIG. 11 shows the structure of an optical card apparatus in the second embodiment;

FIG. 12 is a block diagram showing the whole structure of the second embodiment;

FIG. 13 is an explanatory diagram showing a portion of an optical system in the second embodiment;

FIG. 14(*a–b*) are explanatory diagrams showing a line sensor in the second embodiment;

FIG. 15 is a block diagram showing the structure of a line sensor processing circuit in the second embodiment;

FIG. 16 is an explanatory diagram showing an example of a line sensor output;

FIG. 17 is an explanatory diagram showing the output of an A phase forming circuit and B phase forming circuit;

FIG. 18 is an explanatory diagram showing an example of A phase output when dust sticks to it;

DETAILED DESCRIPTION OF THE PREFERRED EMBODIMENTS

The embodiments of this invention are explained on reference to drawings.

Figure 1A:
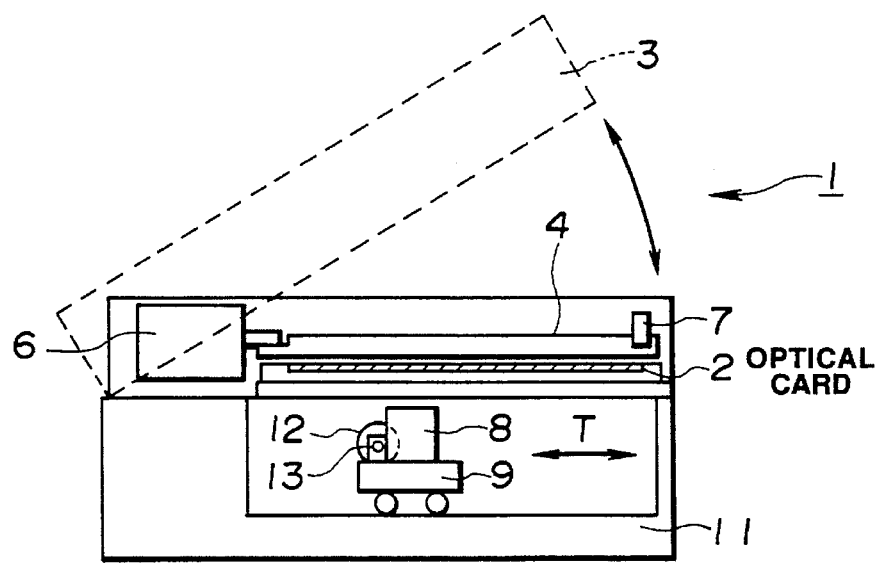
FIG. 1a is a sectional view in the vertical direction of an information recording and/or reproducing apparatus.
Figure 1B:
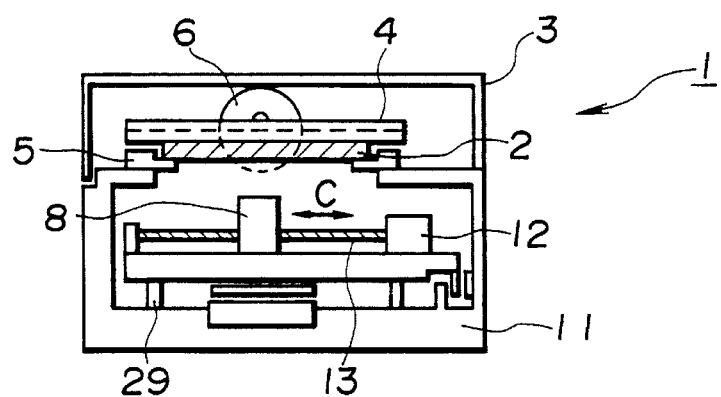
FIG. 1b is a sectional view in the horizontal direction.
Figure 1C:
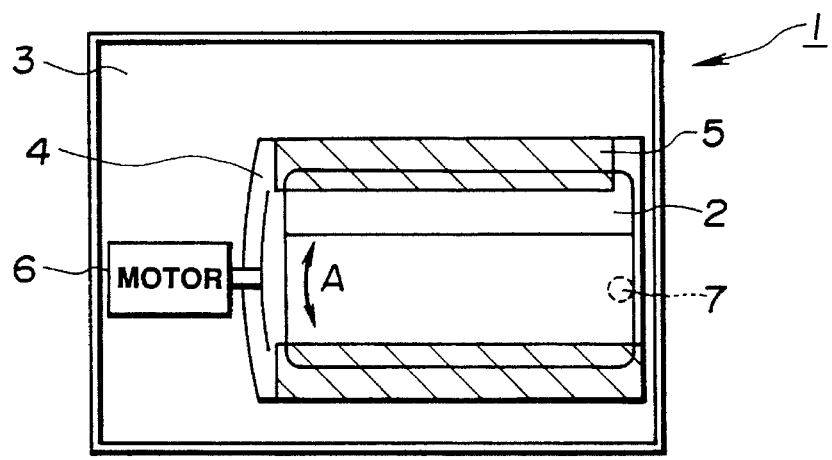
FIG. 1c is a diagram of an upper frame observed from the back. The frame is opened when the optical card is fitted to the apparatus or removed.

As shown in FIG. 1, an optical card apparatus 1 as an information recording and/or reproducing apparatus in the first embodiment of this invention is provided with an optical card 2 as a card-like optical recording medium supported by a tray 4 and a card supporting member 5 in an upper frame 3. The tray 4 has rotatable structure centering round a fulcrum 7 by a skew correcting motor 6 (for example, in FIG. 1c, the optical card 2 is rotatable and movable in the direction of an arrow A in the diagram).

An optical head 8 for recording and/or reproducing information on the optical card 2 (from the optical card 2) is placed on a carriage 9. By the movement of the carriage 9, a lower frame 11 moves in the track direction T of the optical card 2 (a direction in parallel with a linear track provided on the optical card 2, information is recorded on the track, for example, a horizontal direction in FIG. 1a). The movement in the tracking direction C which is a perpendicular direction to the track is performed by a head moving motor 12 and a driving screw 13.

An information reproducing operation starts when the upper frame 3 is closed after the optical card 2 is opened and fitted to the tray 4 as shown by the dotted line of the upper frame 3 being opened in FIG. 1a. At this time, the optical card 2 is pressed against the plane surface of the card supporting member 5 fitted to the upper end surface of the lower frame 11 as shown in FIG. 1b so that a curve in the focus direction (the upper and lower directions in the fitting condition of the optical card 2) is corrected.

Figure 2:
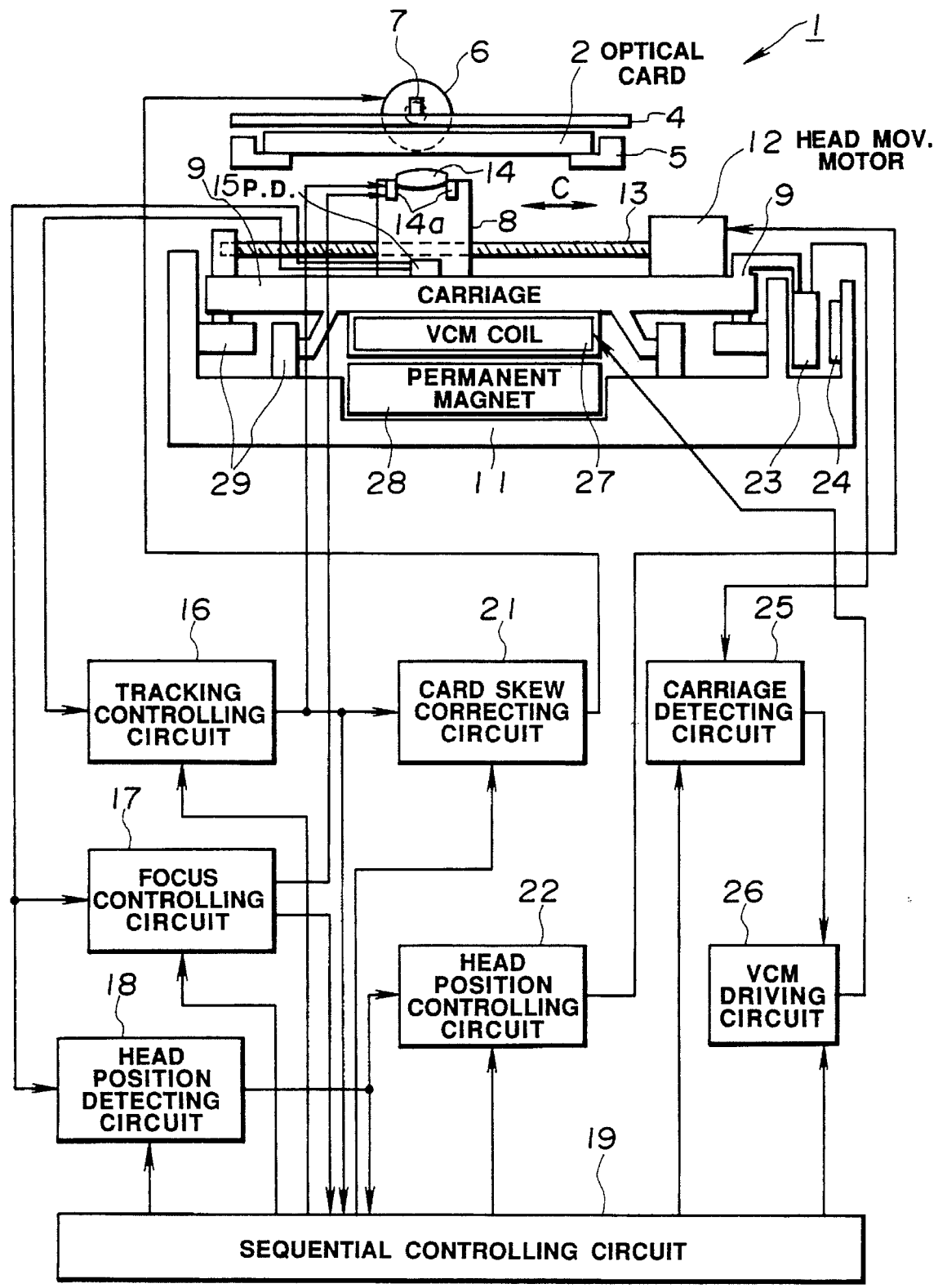

As shown in FIG. 2, a photo detector 15 for receiving reflected light of a light beam irradiated to the optical card 2 through an objective lens 14 is housed. The output of the detector 15 is supplied to a tracking controlling circuit 16, focus controlling circuit 17 and optical head position detecting circuit 18, and then, a tracking error signal, focus error signal and optical head position signal are generated, respectively. Each signal is fed to a sequential controlling circuit 19.

The output signals of the tracking controlling circuit 16 and focus controlling circuit 17 are supplied to the optical head 8, so that the objective lens 14 is driven by way of an objective lens actuator 14a, so that the position of the beam spot irradiated on the optical card 2 can be kept as a tracking condition or focus condition, or moved finely in the tracking direction.

The output signal of the tracking controlling circuit 16 is supplied to a card skew correcting circuit 21. The output signal of the card skew correcting circuit 21 is supplied to the skew correcting motor 6. Then, skew can be corrected after the optical card 2 is attached to.

The output signal of the optical head position detecting circuit 18 is supplied a head position controlling circuit 22. A position controlling signal for controlling the position of the optical head 8 is produced by the head position controlling circuit 22 and supplied to the head moving motor 12 to control the position of the optical head. The head moving motor 12 forms means for moving the position of the beam spot irradiated on the optical card 2 in the tracking direction. Instead of moving the optical head 8 in the tracking direction by the head moving motor 12, the optical card 2 can be moved in the tracking direction.

A sensor 23 for detecting a carriage position such as a photo reflector is fitted to the carriage 9. Then, a reflected and non-reflected pattern 24 is produced on the side of lower side frame 11 opposing to the sensor 23. Therefore, a pulse reflected light (bright and dark light) in accordance with each pattern 24 is detected by the sensor 23 and fed to a carriage position circuit 25.

The position of the carriage 9 is detected by the carriage detecting circuit 25. Through a voice coil motor (abbreviated as VCM, hereinafter) driving circuit 26, a driving signal is supplied to a VCM coil 27. Then, the side of a VCM coil 27 fitted to a carriage 9 is moved in the track direction (perpendicular direction to the sheet of FIG. 2) at a constant speed to a permanent magnet 28 fixed to the lower frame 11, so that the information recorded on the track can be reproduced. The VCM forms means for moving the position of the beam spot irradiated on the optical card 2 in the track direction. Instead of moving the optical head 8 in the track direction in the VCM, the optical card 2 can be moved in the track direction.

Figure 3:
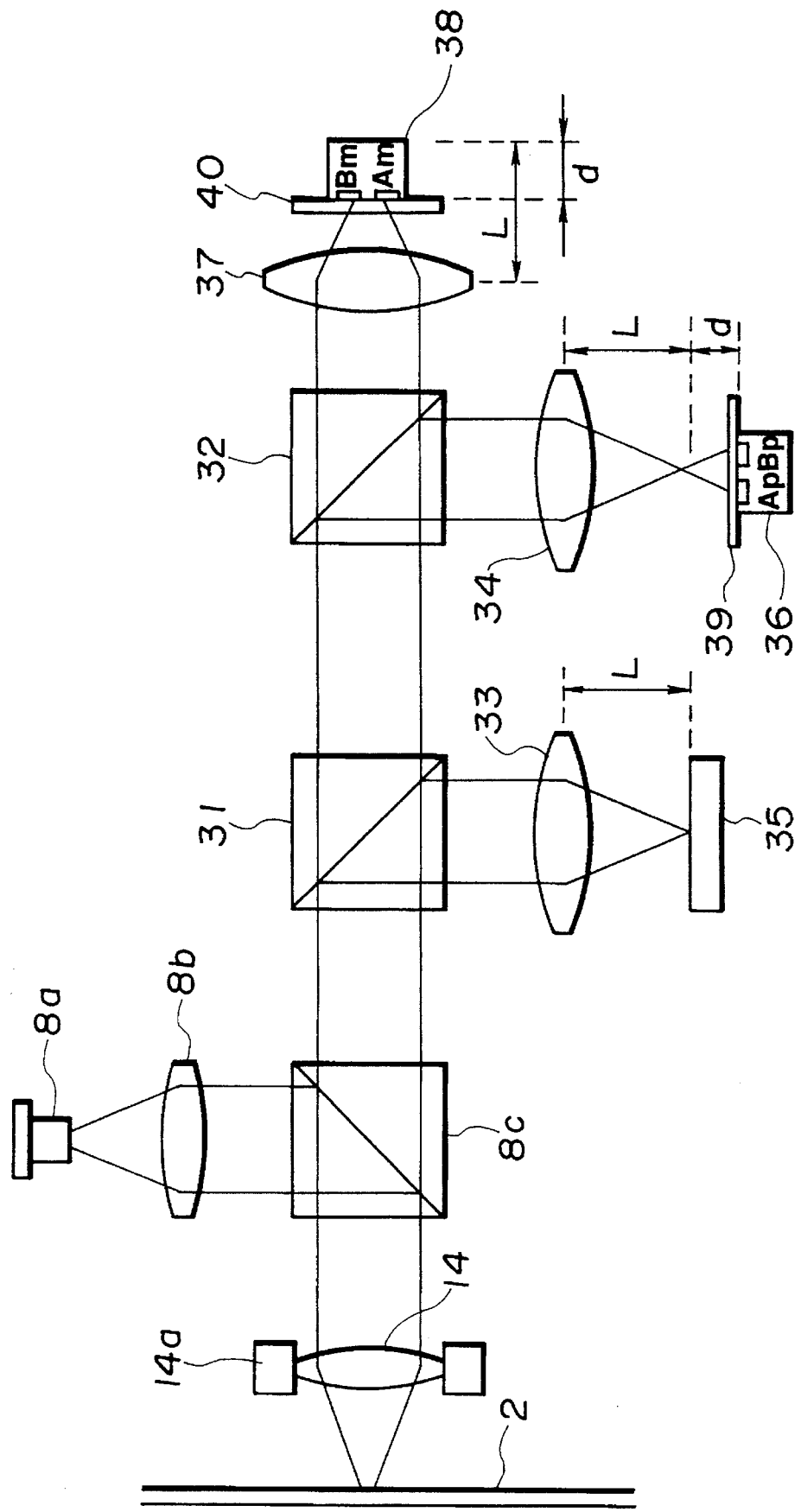
Figure 4A:
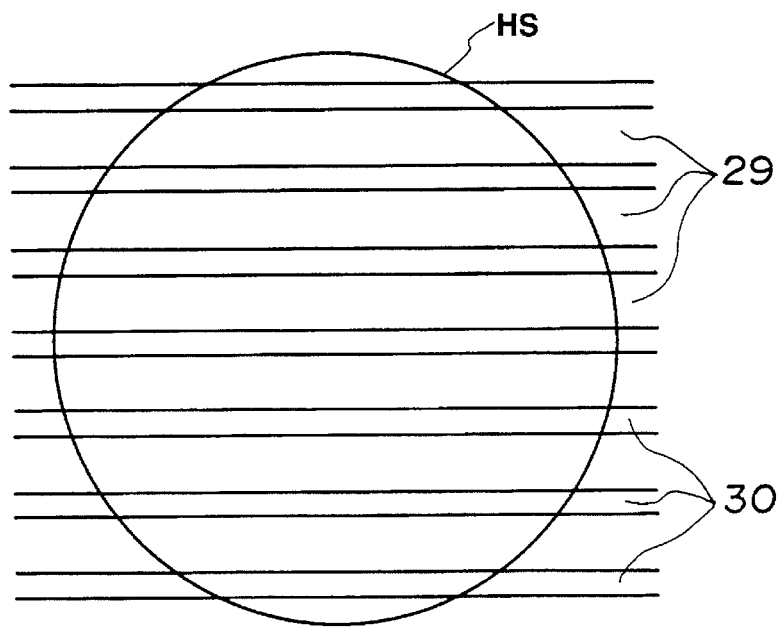

FIG. 3 shows the structure of the optical system of the optical head 8. In FIG. 3, after the light beam generated in a laser diode (or LED) 8a as beam generating means is made to be an almost parallel light beam by a lens 8b, approximately 50% of the light beam is reflected by a half prism 8c and converged through the objective lens 14 to irradiate the optical card 2. The light beam irradiated on the optical card 2 becomes a beam spot HS which illuminates a plurality of tracks over a wide area as shown in FIG. 4a. A reference numeral 29 represents a track and 30 a track guide in FIG. 4a. The reflected light reflected by the beam spot HS branches out into transmitted light and reflected light by a first beam splitter 31 through the objective lens 14 and half prism 8c. The transmitted light further branches out into transmitted light and reflected light by a second beam splitter 32.

The light reflected by the first and second beam splitters 31 and 32 is received by a read and tracking detector 35 used for read and tracking through lenses 33 and 34 having a focal length L, respectively, and by a moire detector 36 for focus and track counting. Also, transmitted light of the second beam splitter 32 is received by a moire detector 38 through a lens 37 having a focal length L. Slits 39 and 40 are arranged in front of moire detectors 38 and 36, respectively, so as to receive the light passed through the slits 39 and 40.

Figure 4B:
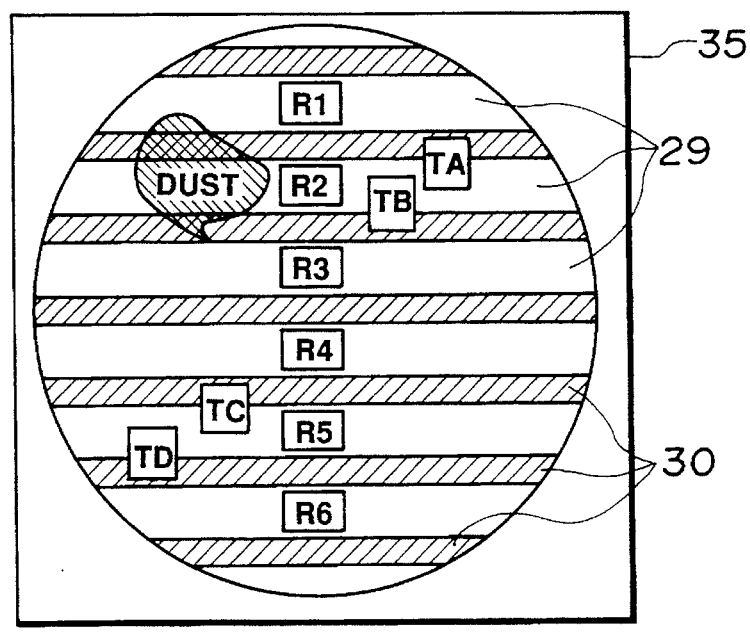

The read and tracking detector 35 is placed on the focus position of the lens 33. The read and tracking detector 35 is arranged as shown in FIG. 4b (FIG. 4b shows the relation between the beam spot in a focus condition and a tracking condition).

The read and tracking detector 35 is composed of six read detector elements R1–R6 and tracking detector elements TA–TD. The read detector elements R1–R6 receive reflected light from the tracks adjacent to the elements, respectively. The tracking detector elements TA–TD are arranged, for example, on the outer side of the central two tracks symmetrically. TA and TD, and TB and TC are arranged symmetrically with respect to the center O of the beam spot HS so that deviation from the tracking condition can be detected. Then, one of pairs of detector elements TA and TB, TA and TD, TB and TC, and TC and TD can be used for detecting tracking.

Figure 5:
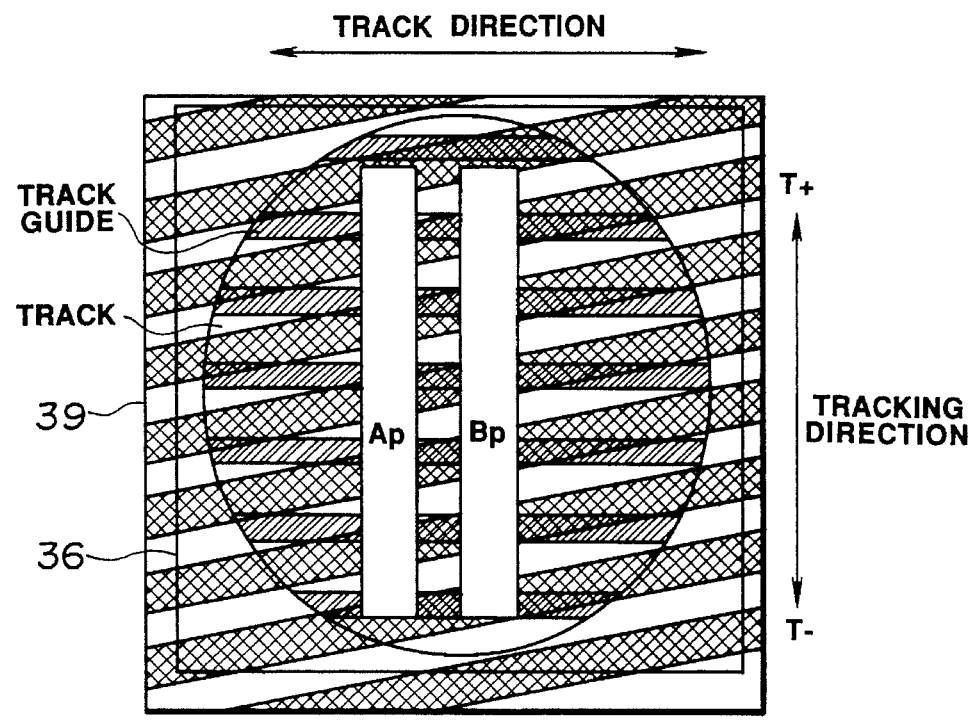

The moire detector 36 is arranged on the outer side apart d from a focal length L. The other moire detector 38 is arranged (on the side of a lens 37) at d before the focal length L. FIG. 5 shows the moire detector 38 related to the reflected light from the optical card 2. Since the optical system is arranged like this, the output of the moire detectors 36 and 38 increases as it approaches the focus position.

As shown in FIG. 3, the slit 39 is located in the position deviated outside d from the focus position. The slit 40 is located in the position deviated inside d from the focus position. When each objective lens 14 is located in the position deviated from the focus position by ±f1, the output of moire detectors 36 and 38 becomes maximum.

A roller 29 is attached to the carriage 9 so as to be able to move the carriage 9 smoothly by rolling on the surface of the lower frame 11. Also, in FIG. 2, each circuit is controlled by the sequential controlling circuit 19.

When the optical card 2 is fitted to the optical card apparatus 1, a skew correcting operation is always performed. This operation corrects the deviation of the carriage moving direction from the direction in which track is formed on the optical card 2. After the optical head 8 is moved in the vicinity of the fulcrum 7, tracking starts. Accordingly, while the optical head moving motor 12 is stopped, the carriage 9 moves little by little (in FIG. 1c, it moves in the left direction where the skew correcting motor 6 is arranged). Then, the skew correcting motor 6 is rotated to make the tracking error signal zero at that time.

That is, the skew correcting motor 6 is driven through a card skew correcting circuit 21 by the tracking error signal of the tracking controlling circuit 16, so that the deviation of the carriage moving direction from the track direction on the optical card 2 is corrected.

Next, a seek operation is conducted. This operation moves the optical head 8 on an objective track. The driving of the optical head 8 is performed by the optical head moving motor 12 and driving screw 13. The moving amount is measured by measuring the moving amount of the beam spot irradiated on the optical card 2.

After the seek operation is completed, an information reproducing operation for the track to be a target is conducted. When the information reproducing operation for the target track is completed and further, if there is a track needed for the information reproduction, the seek operation and information reproducing operation for the track are repeated. Then, when a series of operations are completed, the upper frame 3 is opened to take out the optical card 2 and operation is completed.

Next, with regard to each operation, (1) skew correcting operation, (2) seek operation and (3) information reproducing operation are explained in detail as follows.

(1) Skew Correcting Operation

The skew correcting operation is conducted when the upper frame 3 is closed after the optical card 2 is inserted. Because the skew correcting operation makes the moving direction of the carriage 9 and the track direction in the optical card 2 completely parallel, the light beam is disposed on a track near the fulcrum 7 after the operations of focus search, tracking on and focusing on are performed. Then, while the carriage 9 is moved little by little, the skew correcting motor 6 is rotated regularly and inversely in the direction in which tracking error decreases, so that the position of the tray 4 is determined.

(a) focus search operation, (b) tracking on operation, (c) focusing on operation and (d) tray disposing operation will be explained as follows.

(a) Focus Search Operation

When the focus search operation starts, the objective lens 14 in the optical head 8 is disposed so as to arrange the lens in a neutral position in the tracking direction and a farthest position from the optical card 2 in the focusing direction. After that, while micro-vibration is added to the lens in the tracking direction by the tracking controlling circuit 16, focus adjustment is moved in the direction approaching the optical card 2. Then, through the structure of the optical system shown in FIG. 3, the reflected light from the optical card 2 is received by the moire detector 36.

As the aforementioned, when the objective lens 14 is located in the position deviated from the focus position by ±f1, the output of the moire detectors 36 and 38 becomes maximum.

Figure 6A:
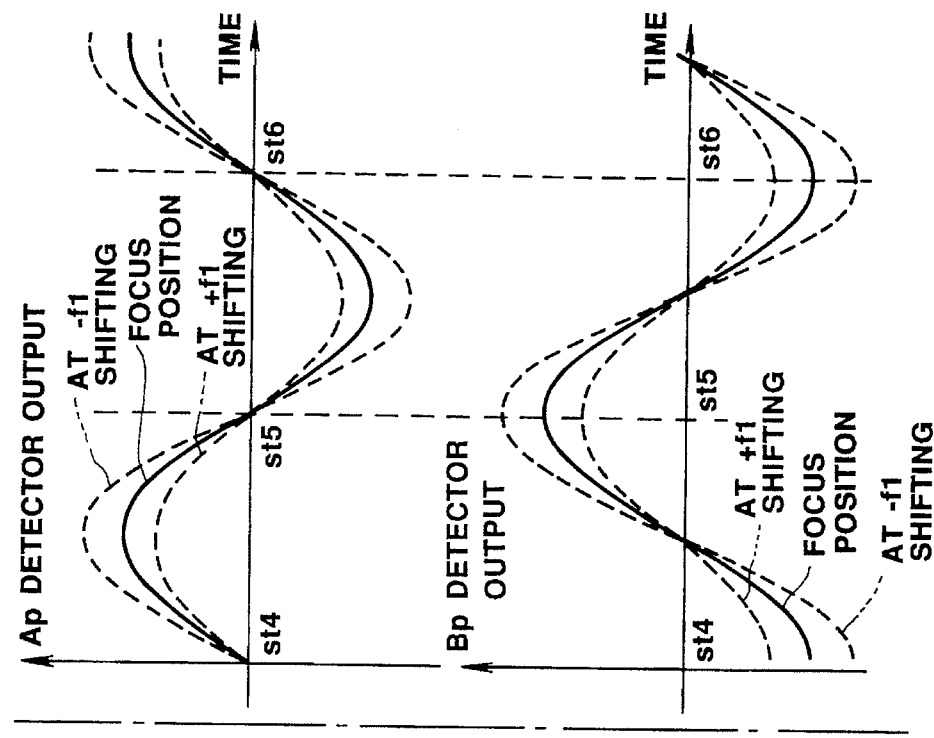
Figure 6B:
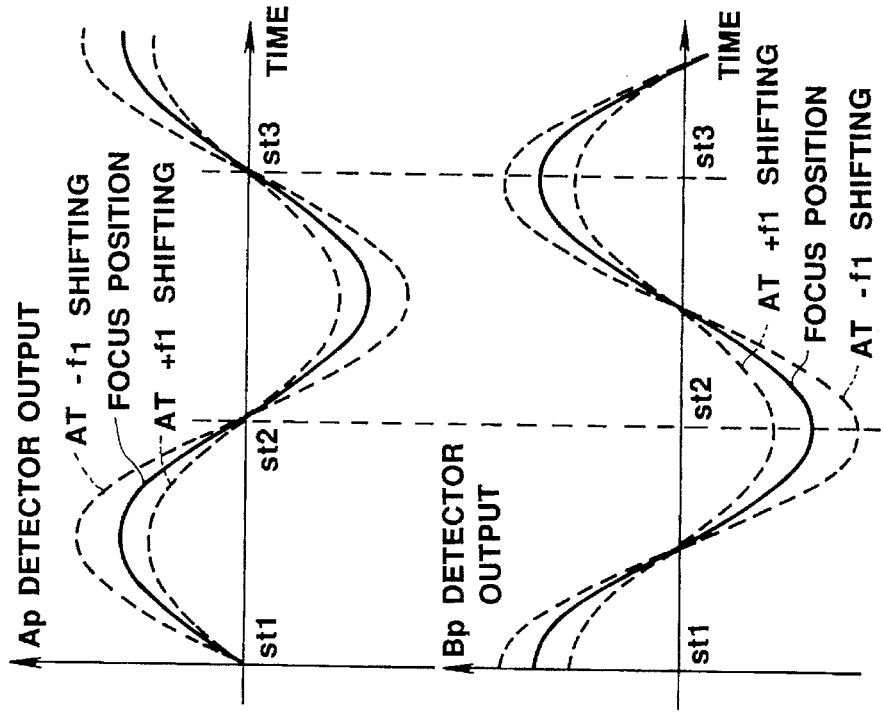

FIG. 6 shows the output of the moire detector 36 near the focus position. FIG. 6a is the case where the vibration direction is the T+ direction in FIG. 5. FIG. 6b is the case where the vibration direction is the T− direction in FIG. 5. The moire detector 36 is composed of detectors (Ap, Bp) arranged in the position in which phase difference is 90 degrees where the skew of the optical card 2 is zero. As shown in FIG. 5, by the detectors (Ap, Bp), moire fringes generated by an bright and dark pattern consisting of a track position and track guide position of the reflected beam from the optical card 2 and slits of the same pitch as the track pitch of the optical card 2 formed in the slit 39 is detected.

That is, as shown in FIG. 5, slits formed in the slit 39 is made to be inclined toward the track direction and also, the detectors (Ap, Bp) are positioned at regular intervals in the track direction. The detectors are set so that the quantity of received light at the Bp detector is minimum when the quantity of the received light at the Ap detector is maximum. As a result, the relation between the output of the detectors (Ap, Bp) is shown in FIG. 6.

In other words, the output of the Bp detector at each zero cross point (st1–st6 in FIG.6) of the output of the Ap detector is a maximum or minimum at the focus position. The tracking direction (track crossing direction) of the beam spot can be detected by the maximum value or minimum value. Also, the crossing track number can be detected by counting difference signals.

Figure 7:
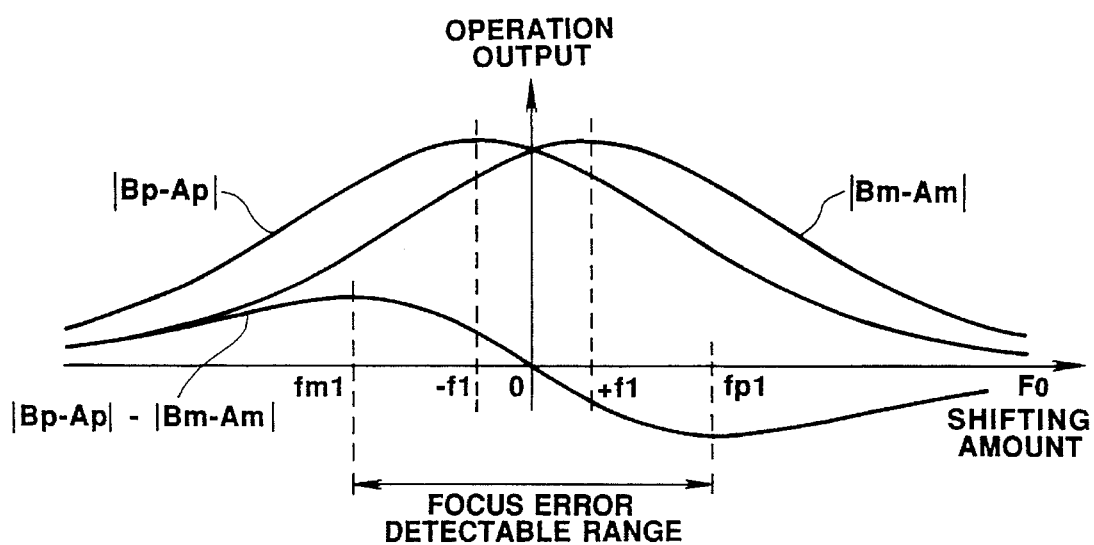

The position of the slit 39 in the Ap and Bp detectors is deviated from the focus position by +d, so that the quantity of received light by the Ap and Bp detectors has the maximum amplitude when the position in the focus direction is deviated from the focus position by −f1. Accordingly, if |Bp-Ap| is calculated in every zero cross point of the output of the Ap detector, the operation output for the focus deviation amount can be obtained as a curve having the maximum value at −f1 of the focus deviation amount as shown in FIG. 7.

Also, in the case of the moire detector 38, the curve having the maximum value of the focus deviation amount at +f1 can be obtained in the same way as the aforementioned. Therefore, the calculation of |Bp-Ap|−|Bm-Am| can obtain a sigmoid curve centering the focus position as shown in FIG. 7. In this embodiment, the focus control near the center of "focus error detecting range" in FIG. 7 is changed over from a search signal to the |Bp-Ap|−|Bm-Am| signal and transferred to a tracking on operation along with the completion of a focus search operation.

Figure 8:
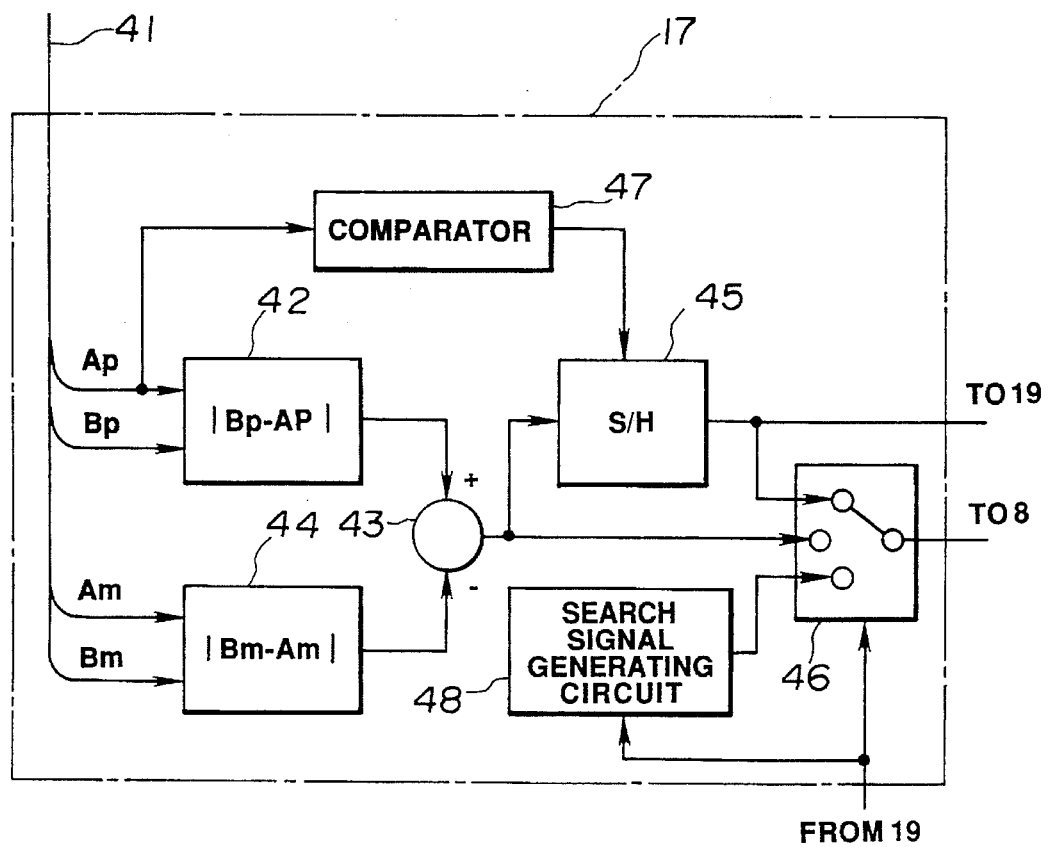

On reference to FIG. 8, the structure of the focus controlling circuit 17 performing the focus search operation is explained in further detail.

In FIG. 8, a reference numeral 41 represents the output from the moire detectors 36 and 38 (Ap, Am, Bp, Bm). The output of the Ap and Bp detectors enters a |Bp-Ap| operation circuit 42 for calculating |Bp-Ap|. The output of the calculated |Bp-Ap| is supplied to a subtracting circuit 43. The output of Am and Bm detectors enters a |Bm-Am| operation circuit 44. The calculated output of |Bm-Am| enters the subtracting circuit 43. |Bp-Ap|−|Bm-Am| is supplied from the subtracting circuit 43 to a sample and hold circuit 45 and changeover circuit 46.

The output of the Ap detector is added to a comparator 47, as well. The zero cross point (st1–st6 in FIG. 6) is added to the sample and hold circuit 45 as a control signal. The output of the subtracting circuit 43 is sampled by the output from the comparator 47, so that the sample and hold circuit 45 outputs the signal indicated by |Bp-Ap|−|Bm-Am| in FIG. 7.

A search signal generating circuit 48 generates a driving signal for driving the objective lens 14 in the optical head 8 so as to make the lens approach the optical card 2 from the farthest position gradually by a focus search operation according to a command from the sequential controlling circuit 19. The changeover circuit 46 changes over the output from the subtracting circuit 43, sample and hold circuit 45 and search signal generating circuit 48 according to the command from the sequential controlling circuit 19 to the optical head 8.

When focus search starts, the sequential controlling circuit 19 directs that the operation of a search signal generating circuit 48 starts with the selection of the signal from the search signal generating circuit 48 to the changeover circuit 46. Accordingly, while vibrating finely in the tracking direction as the aforementioned, the objective lens 14 approaches the optical card 2 from the farthest position little by little. In FIG. 7, the output of the sample and hold circuit 45 at the time moves the signal indicated by |Bp-Ap|−|Bm-Am| from left to right. The signal passes through +fm1 and −f1 and reaches the focus position(0) in FIG. 7.

The output of the sample and hold circuit 45 is added to the sequential controlling circuit 19. The sequential controlling circuit 19 confirms that the output becomes a focus position (0), and then, makes the changeover circuit 46 change over to the output of the sample and hold circuit 45. Then, the focus search operation is completed and moved to the tracking on operation.

(b) Tracking on Operation

The tracking on operation stops the micro-vibration in the tracking direction added by the focus search operation, and then, starts tracking by using the output of the detector (TA, TB, TC, TD in FIG. 4) in a read and tracking detector 35. The tracking error signal is selected from among difference signals, TA-TB, TA-TD, TC-TD and TC-TB and used in accordance with the state of dust on the optical card 2 and an injury on each occasion.

Figure 9:
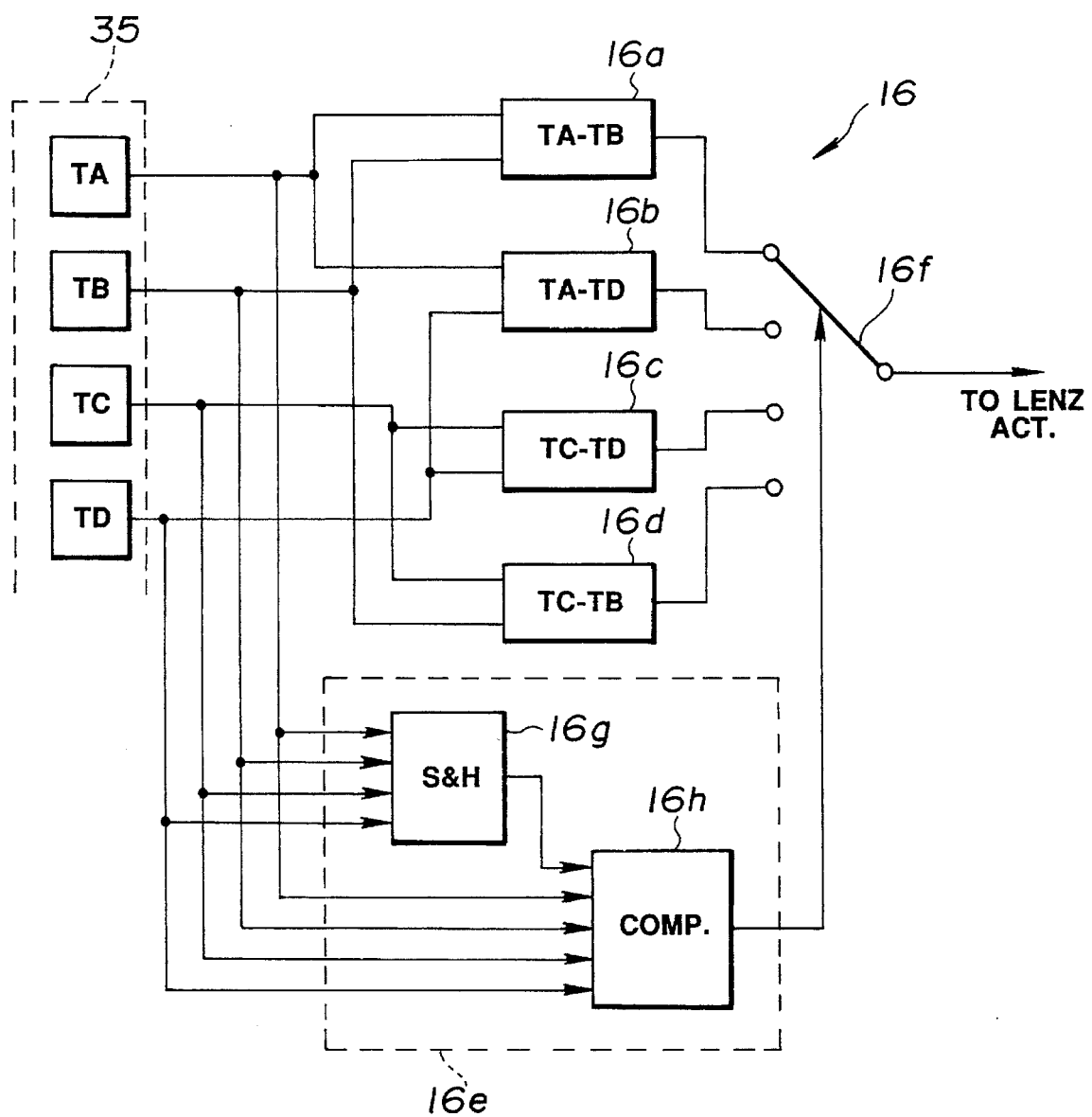

For example, as shown in FIG. 9, the difference signals, TA-TB, TA-TD, TC-TD and TC-TB are produced from the output of the detector elements TA, TB, TC and TD by subtractors 16*a*, 16*b*, 16*c* and 16*d*. One of these difference signals is selected through a selecting switch 16*f* and supplied to the lens actuator 14*a*.

The output signals of the detector elements TA, TB, TC and TD are supplied to a monitor circuit 16*e* for monitoring the change of a signal level so as to monitor the change of these signals, select one of tracking signals TA-TB, TA-TD, TC-TD and TC-TB used by controlling the selecting switch 16*f* and supply the tracking signal to the lens actuator 14*a*. For example, the monitor circuit 16*e* consists of a sample and hold circuit 16*g* for sampling and holding the detector elements TA, TB, TC and TD and a comparing circuit 16*h* for comparing the output of the sample and hold circuit 16*g* and the output of the detector elements, TA, TB, TC and TD and for detecting the change of a time level. When the comparing circuit 16*h* detects the change of a time level, the selection of the selecting switch 16*f* is controlled so as to use the difference signal having small level change as a tracking error signal.

For example, during the tracking at TA-TB, if the output level of the detector elements TA and TB decreases by the dust shown in FIG. 4*b* or the like, the comparing circuit 16*h* detects the decreased output. Then, difference signal having small output level change by other detector elements TC and TD, that is, TC-TD is selected, and the tracking is continued.

(c) Focusing on Operation

After the tracking on operation is completed, the images of the track and track guide of the optical card 2 on the moire detectors 36 and 38 are fixed in the tracking direction. Then, each detector output becomes zero in the Ap and Am detectors and the maximum value (clearest value) in the Bp and Bm detectors. This is the condition at st 1 and st 3 in FIG. 6. Therefore, the sequential controlling circuit 19 measures the tracking error signal from the tracking controlling circuit 16. Immediately after the tracking on operation is completed and the tracking error signal settles, the changeover circuit 46 selects a signal from a subtracting circuit 43, and then, a focusing on operation is completed.

(d) Tray Position Determining Operation

After the focusing on operation is completed, a tray position determining operation moves the carriage 9 gradually (in the direction of the skew correcting motor 6 in FIG. 1*c*), and then, the skew correcting motor 6 is rotated in the regular and reverse rolling direction so as to make the tracking error signal zero when the head moving motor 12 is remained stationary. The tracking error signal is proportional to the position change of the objective lens 14. Therefore, if the tracking error signal becomes zero when the carriage 9 finishes its movement to the opposite side, the track on the optical card 2 becomes parallel with the moving direction of the carriage 9. Then, the skew of the optical card 2 is corrected.

The aforementioned operation is performed in the order of passing the track detector output from the optical head 8 in FIG. 2 through the tracking controlling circuit 16 and the card skew correcting circuit 21, rotating the skew correcting motor 6 and changing the inclination of the moving direction of the carriage 9 of the optical card 2 by the tray 4. Also, the tracking error signal is added to the sequential controlling circuit 19. Then, the sequential controlling circuit 19 determines the completion of the tray position determining operation from the condition of the tracking error signal at completing the movement of the carriage 9.

That concludes the explanation of the skew correcting operation.

(2) Seek Operation

When a seek operation starts, the sequential controlling circuit 19 stops the tracking operation and starts to move the optical head 8 by the head moving motor 12. In addition, it makes the output of the changeover circuit 46 a signal from the sample and hold circuit 45. Then, a focus servo operation is conducted in every zero cross point of the output of the Ap detector as the aforementioned and changed over from a continuous servo to a sample servo for producing a focus error signal.

Also, the moving amount of the optical head 8 is detected by the head position detecting circuit 18 using the detector output (Ap, Bp, Am, Bm) from the moire detectors 36 and 38. In the head position detecting circuit 18, the position is detected by selecting one of two pairs of (Ap, Bp) and (Am, Bm).

For example, when the focus error signal is positive, (Ap, Bp) is selected and when negative, (Am, Bm) is selected, so that a signal near a focus position is selected. Specifically, the sequential controlling circuit 19 judges to direct the head position detecting circuit 18 by the focus error signal from the sample and hold circuit 45 added to the sequential controlling circuit 19.

Although the head position detecting circuit 18 detects the position, (Ap, Bp) and (Am, Bm) are phase difference signals having the difference of 90 degrees and the circuit which decodes the signal four times and counts the signal is known, therefore, the explanation is omitted. The position signal from the head position detecting circuit 18 is supplied to the sequential controlling circuit 19 and the head position controlling circuit 22, which drives the head moving motor 12 based on the position signal from the head position detecting circuit 18. Then, the optical head 8 is moved to the objective position directed by the sequential controlling circuit 19.

Next, the effect of dust will be explained. Suppose that dust is stuck to the position shown in FIG. 4b and its reflectance is the same as that of the track guide of the optical card 2. If the optical head 8 moves in the direction of T+ by the seek operation in FIG. 5, the dust affects the Ap and Am detectors. At this point, the Ap detector will be explained. As shown in FIG. 5, the Ap detector receives the quantity of light for six tracks at a time as shown in FIG. 5.

Figure 10:
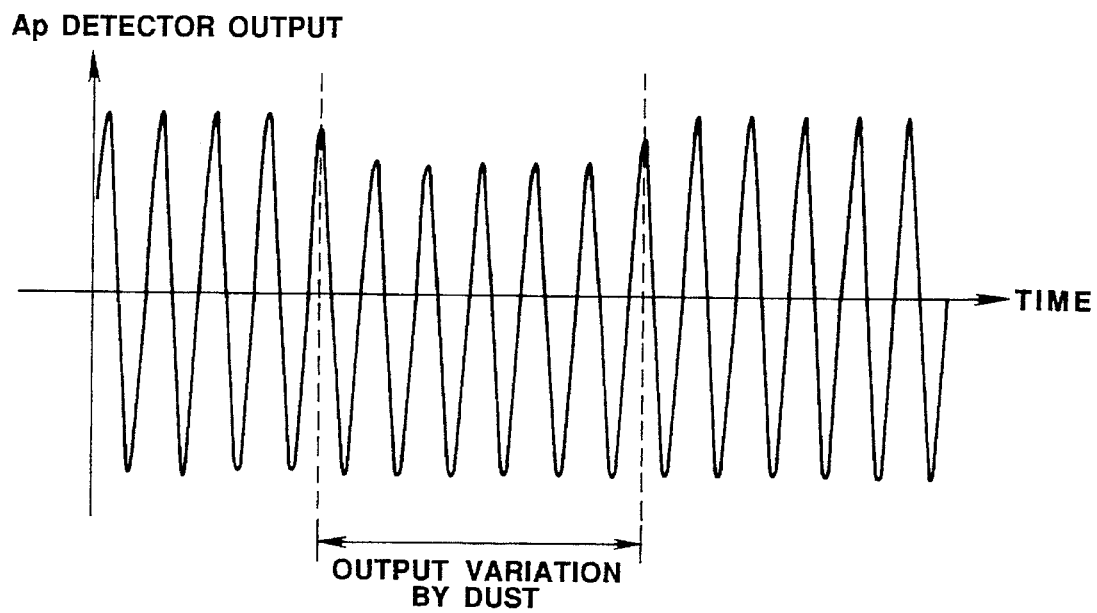

The much quantity of light the Ap detector receives, the output increases. The dust covers a track, so that the maximum value of the output of the Ap detector decreases to 5/6 as shown in FIG. 10 during the output passes through the track to which the dust is stuck. In this case, because the decrease in the output occurs in common with the Ap and Am detectors and the output is decreased to about 5/6, the decrease does not have a bad influence on the seek operation. Also, the detectors affected by the position stuck by the dust become Bp and Bm or all of Ap, Am, Bp and Bm; however, the influence of the dust is averaged and becomes small as the aforementioned, therefore, the seek operation is conducted stably.

(3) Information Reproducing Operation

The movement on the medium of the light beam is directly counted by the seek operation, so that the light beam is disposed on the objective track when the seek operation is completed.

In an information reproducing operation, after the tracking on and focusing on operations are performed in completing the seek operation, the carriage 9 is driven. In the skew correcting operation, the tracking on and focusing on operations have been explained, thus, the explanation is omitted. With the movement of the carriage 9, the optical head 8 scans the track of the optical card 2 while irradiating a light beam to the track, and then reads the recorded data.

The data in six tracks is read parallel with each other by the detectors (R1–R6) for reading shown in FIG. 4. All the read data besides the objective track data is stored in the memory in the information reproducing apparatus corresponding to the track numbers. The memory capacity is a card. Because the information read from a fitted card including the track information besides the objective track is stored as the aforementioned, the data in the memory is transmitted without conducting the seek operation and reproducing operation when the information of a target track in the next reproducing operation is contained in the memory, so that the reply speed of the apparatus is improved.

According to the first embodiment, a target track can be sought stably and quickly even if there is dust, and then, the information can be reproduced.

Next, the second embodiment of this invention will be explained.

Figure 11A:
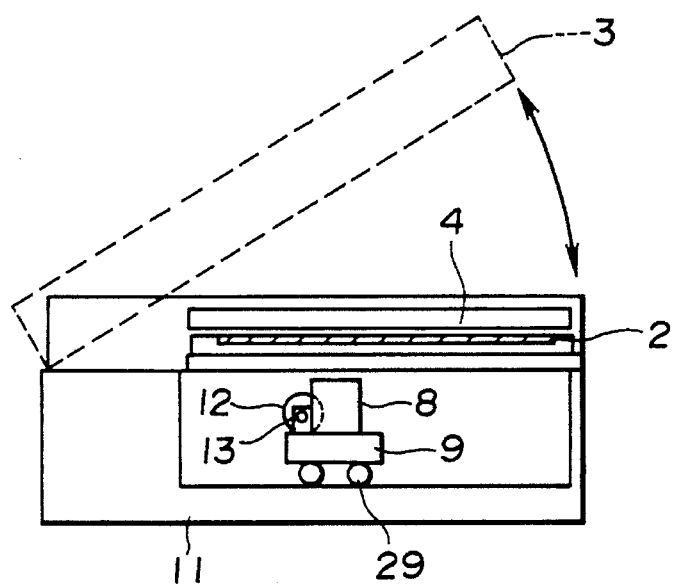
FIG. 11a is a sectional view in the vertical direction of an information recording and/or reproducing apparatus.
Figure 11B:
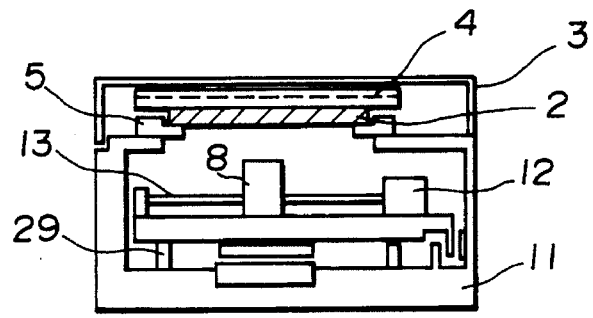
FIG. 11b is a sectional view in the horizontal direction.
Figure 11C:
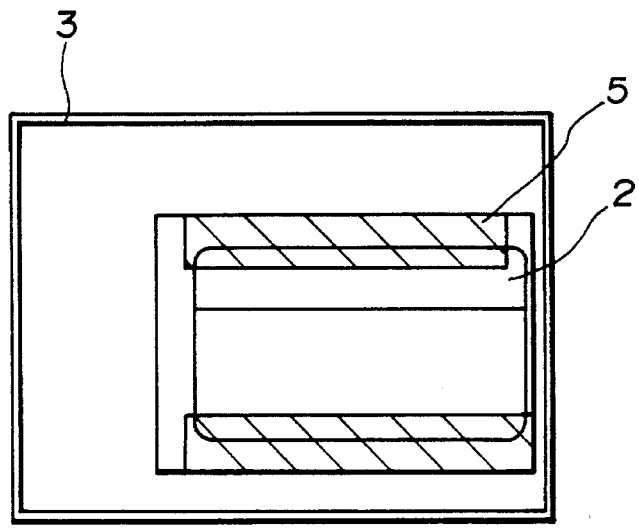
FIG. 11c is a diagram of an upper frame observed from the back. The frame is opened when the optical card is fitted to the apparatus or removed.

This embodiment, which is different from the first embodiment, does not perform skew correction by the rotation of the tray. Accordingly, as shown in FIG. 11, the skew correcting motor 6 shown in the first embodiment is removed as shown in FIG. 11, so that the frame 3 is thin. Also, FIG. 11 shows that the card skew correcting circuit 21 in this embodiment supplies the low component of the input tracking error signal to the head position controlling circuit 22.

The detector 15 has a line sensor. The output of the line sensor is fed to a line sensor processing circuit 53. The output of the line sensor processing circuit 53 enters the sequential controlling circuit 19 and the head position controlling circuit 22. The other formations are the same as in the second embodiment. The same reference numerals are given to the same members and parts having the same functions.

In this embodiment, after the optical card 2 is fitted, the skew correcting operation is not performed that is different from the first embodiment. Then, after the reproducing operation is immediately carried out for confirming the present position, the seek operation and the reproducing operation are repeated in the order of the seek operation and reproducing operation. (1) reproducing operation and (2) seek operation will be explained as follows.

(1) Reproducing Operation

In the reproducing operation, focus search operation and focusing on operation are performed first. In this embodiment, a focus detecting system uses a known beam size method. Thus, the formation of the beam size method and the focus search and focusing on operations by the beam size method are known. Accordingly, the explanation is omitted.

The reproducing operation is performed by moving the carriage 9 in the track direction of the optical card 2 after the tracking operation starts. Because the tracking operation is the same as that in the first embodiment, the explanation is omitted. During the tracking operation, the objective lens 14 in the optical head 8 is located on the reproducing track. Thus, if the optical head 8 stops as in the first embodiment, it can be considered that the displacement of the objective lens 14 in the optical head 8 (moved from a neutral position) exceeds the capacity when the skew component of the optical card 2 is large.

Figure 12:
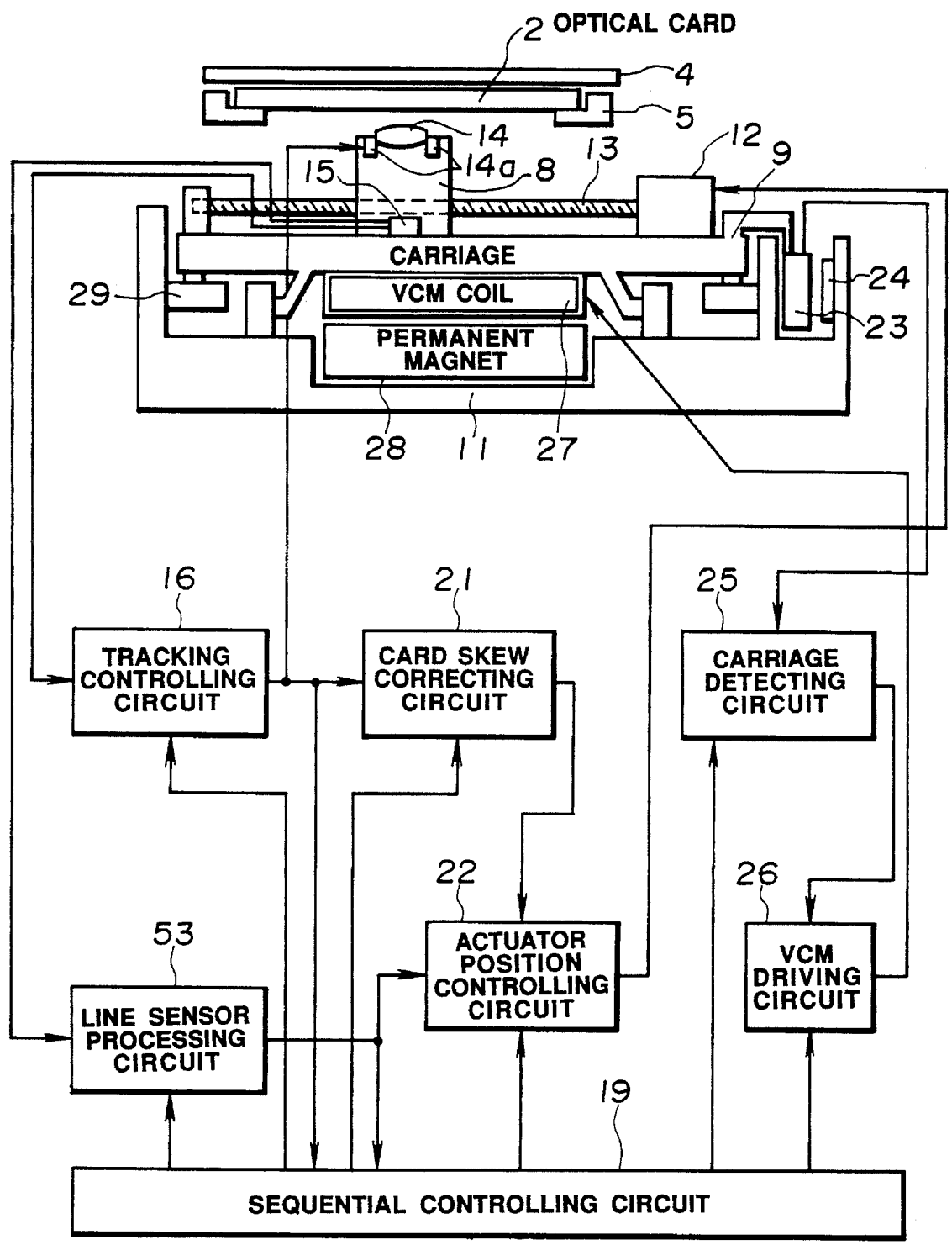

In this embodiment, the card skew correcting circuit 21 which receives the tracking error signal from the tracking controlling circuit 16 adds the low range component of the tracking error signal to the head position controlling circuit 22 as shown in FIG. 12.

The head position controlling circuit 22 drives the head moving motor 12 in accordance with the output of the card skew correcting circuit 21, and drives and controls the optical head 8 so as to make the displacement amount of the objective lens 14 caused by skew small. As a result, the skew of the optical card 2 is corrected, thereby, a stable reproducing operation is carried out.

Because readout and process of the data are the same as that in the first embodiment, the explanation is omitted.

(2) Seek Operation

Figure 13:
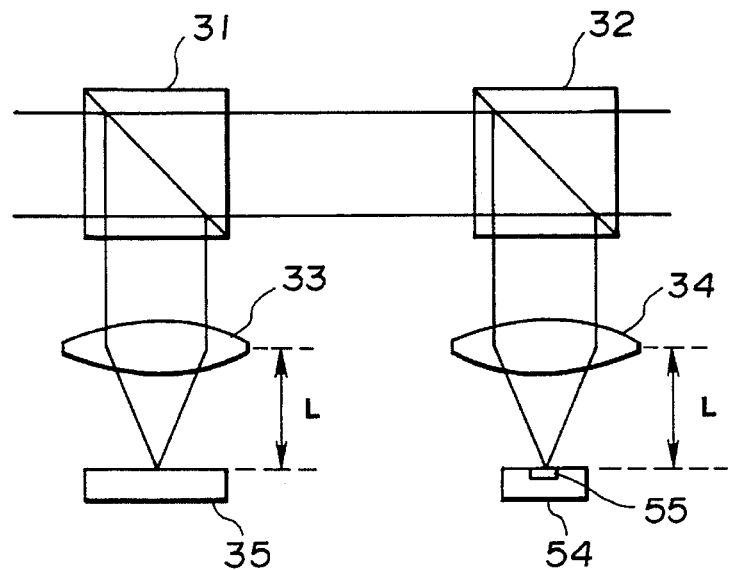

FIG. 13 shows the formation of a portion of the optical system in this embodiment. In this diagram, data readout and tracking is conducted by the read and tracking detector 35 as in the first embodiment. A track count is carried out by the measurement of the change of the bright and dark pattern consisting of the track part and track guide part of the reflected beam focused on a line sensor 55 of a detector 54 from the optical card 2.

In the seek operation, the optical head 8 is moved to the objective position on the optical card 2 directed by the optical head position controlling circuit 22. The movement of the optical head 8 is detected by processing the output of the line sensor 55 in the optical head 8 by a line sensor processing circuit 53, so that the present position is output. The head position controlling circuit 22 drives the head moving motor 12 in accordance with the difference between the aforementioned present position and the objective position from the sequential controlling circuit 19.

Figure 14B:
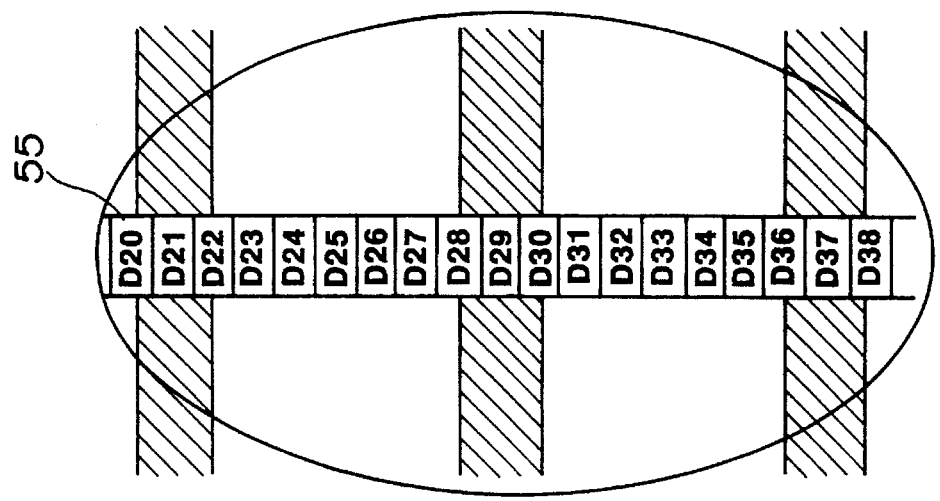
Figure 14A:
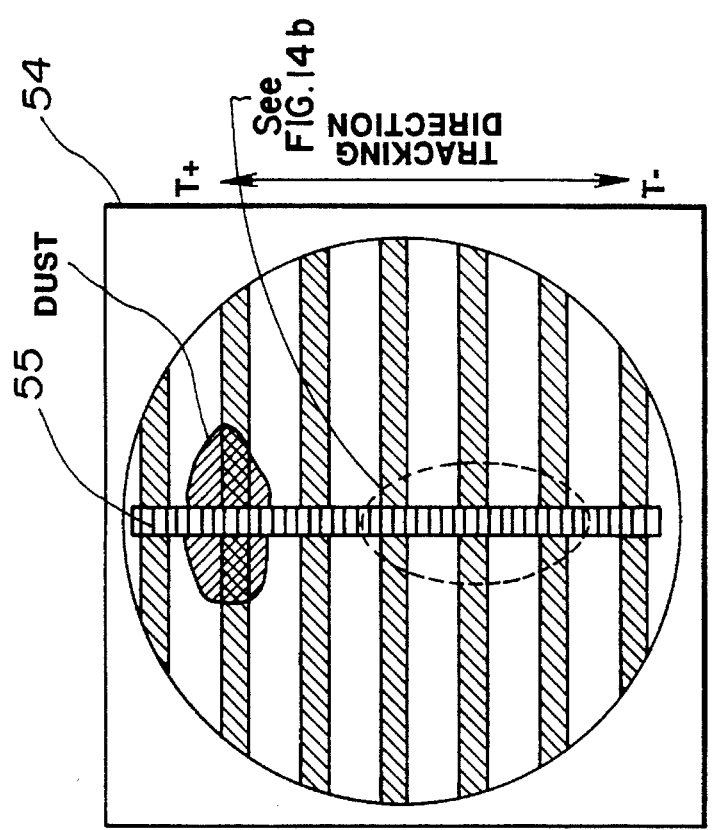

The line sensor 55 is arranged on the focus position as shown in FIG. 13. The position of the line sensor 55 is related to the reflected beam as shown in FIGS. 14a and 14b. The position signal producing method in this embodiment will be explained below. As shown in FIG. 14a, the line sensor 55 is disposed in the tracking direction being perpendicular to the track of the reflected beam, thereby, the output of each detector becomes the output repeated in accordance with a track pitch (a track pitch in this embodiment contains eight detectors). FIG. 14b shows an enlargement of a part of FIG. 14a.

Figure 15:
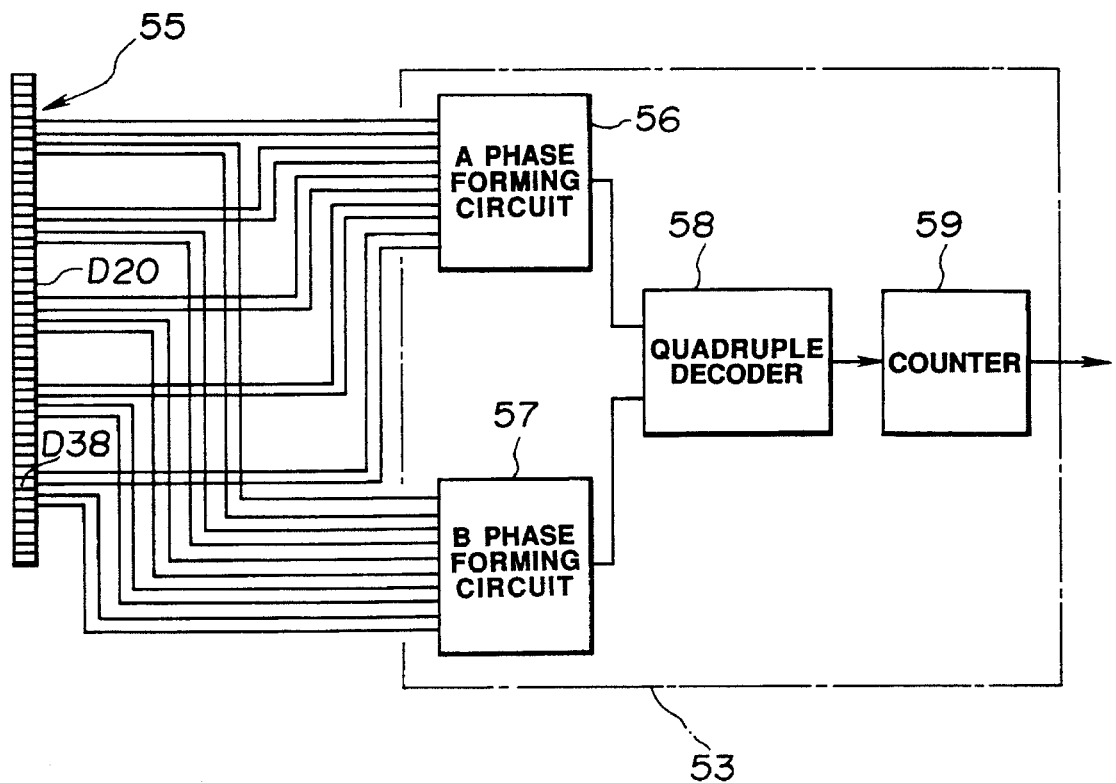

FIG. 15 shows a concrete formation of the line sensor processing circuit 53. An A phase forming circuit 56 selects five combinations of two detectors in every eight detectors as an A phase signal, adds them and outputs them. Also, a B phase forming circuit 57 uses a detector as B phase output in the position in which two detectors are shifted so as to shift the phase by 90 degrees to the A phase and outputs the same as the A phase signal. Specifically, the output is obtained as follows:

A phase output=(D5+D6)+(D13+D14)+(D21+D22)+(D29+D30)+(D37+D38)

B phase output=(D7+D8)+(D15+D16)+(D23+D24)+(D31+D32)+(D38+D39).

Figure 16:
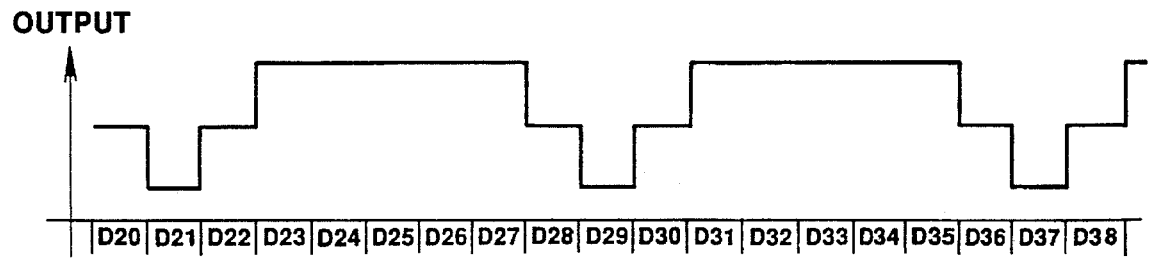

The output of the A phase signal forming circuit 56 and B phase signal forming circuit 57 is counted by a counter 59 through a four times decode circuit 58 and supplied to the head position controlling circuit 22 as a position signal. Since the four times decode circuit 58 and the counter 59 are known, the explanation is omitted. FIG. 16 shows the state of detectors (D20–D38) in the line sensor and reflected beam in FIG. 14b.

Figure 17:
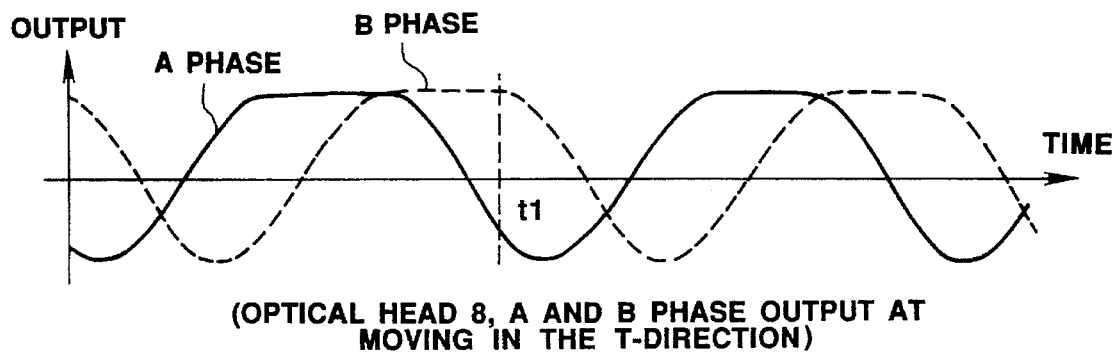
Figure 18:
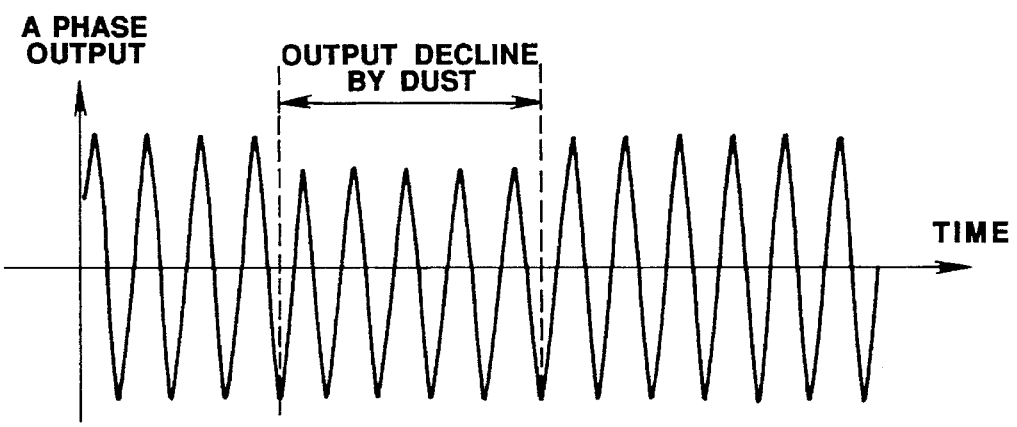

FIG. 17 shows the output of the A phase and B phase in the case in which the optical head 8 is moving in the T+ direction in FIG. 14a. In this diagram, t1 is a point where the moving line sensor and reflected beam become the state in FIG. 14b. As the relationship between the A phase and B phase is clarified by their forming methods, the B phase advances 90 degrees to the A phase when moving in the T+ direction, and on the contrary, is delayed for 90 degrees when moving in the T– direction.

A position signal from the line sensor processing circuit 53 is added to the sequential controlling circuit 19 and head position controlling circuit 22. The head position controlling circuit 22 drives the head moving motor 12 based on the position signal from the head position controlling circuit 18, and then, moves the optical head 8 to the objective position directed by the sequential controlling circuit 19.

Next, the influence of dust will be explained. Suppose that dust is stuck to the position shown in FIG. 14a and its reflectance is the same as that of the track guide of the optical card 2. Also, suppose that the width of the dust size is one track and less (eight detectors of the line sensor 55 and less). If the optical head 8 moves in the T+ direction in FIG. 14a by the seek operation, the dust affects the output of the line sensor 55, so that the output of the A phase and B phase decreases.

The A phase and B phase are the sum of ten detectors' output. The sum of about every two detectors is affected by the dust, therefore, for example, in the case of the A phase output, while the line sensor 55 is covered with dust, the output becomes 4/5 and the state continues for five waves. However, such decrease of the output does not have a bad influence upon the seek operation. Therefore, the seek operation will be stably conducted without being affected by the dust.

The effect of this embodiment is the same as that in the first embodiment.

Next, the third embodiment of this invention will be explained as follows.

In this embodiment, the same reference numerals are given to the same members and parts having the same function as that in the second embodiment. In this embodiment, the line sensor 55 and line sensor processing circuit 53 in the second embodiment are replaced with a slit 61, detector unit 62, phase difference detecting circuit 63 and detector processing circuit 64.

Figure 20:
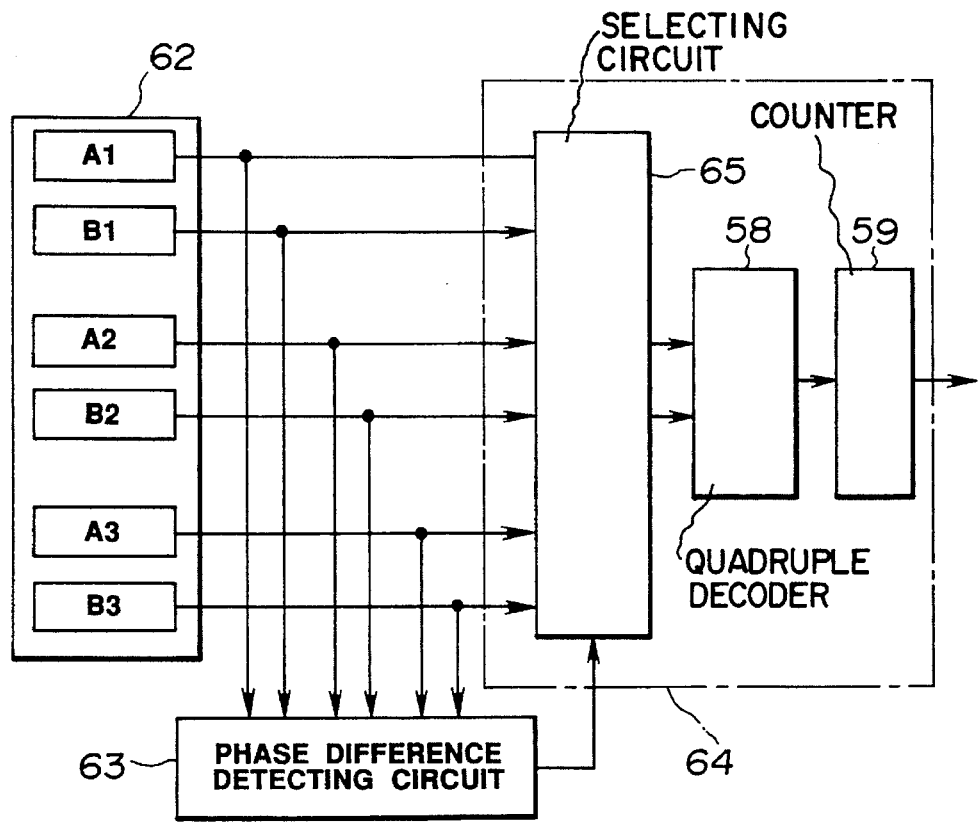
FIG. 20 is a block diagram showing the structure of a detector processing circuit in the third embodiment.

As shown in FIG. 20, the detector unit 62 consists of three combinations (six) of detectors (A1, B1), (A2, B2) and (A3, B3).

In this embodiment, the skew correction of the optical card 2 is not conducted as in the second embodiment, so that the image of reflected beam is inclined for the skew.

Figure 19:
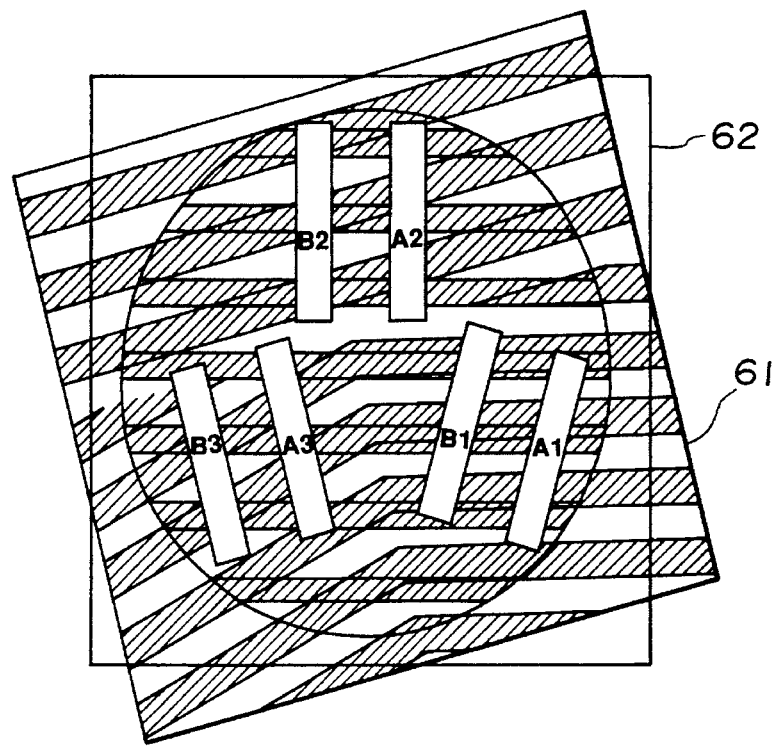
FIG. 19 is an explanatory diagram showing a slit and a detector unit in a third embodiment.

In this embodiment, in order to deal with this inclination, a combination of slit and detector inclined to a regular and reverse direction is previously prepared as shown in FIG. 19. Then, the combination having the phase difference of the output which is the nearest to 90 degrees is selected to use. In the diagram, (A1, B1) is a combination of detectors inclined in the regular direction, (A2, B2) is a combination of detectors without having inclination and (A3, B3) is a combination of detectors inclined in the opposite direction. When the skew of the optical card 2 is zero, the phase difference of (A2, B2) detectors' output becomes 90 degrees. The more the skew amount increases in the regular direction, the phase difference of the output of the (A1, B1) detector approaches 90 degrees.

In this embodiment, the optical head 8 is moved after the optical card 2 is fitted, and then, a combination of detectors in which a phase difference detecting circuit 63 is the nearest to a phase difference of 90 degrees is selected to direct a selecting circuit 65 in a detector processing circuit 64. The selected circuit 65 determines the combination of detectors used in the optical card 2 based on the command of the phase difference detecting circuit 63 and supplies it to the four times decode circuit 58. Since the operation after the completion of the process for the skew of the optical card 2 by the aforementioned operation is the same as that in the second embodiment, the explanation is omitted.

The effect of the third embodiment becomes almost the same as that in the first embodiment.

A different embodiment can be formed by combining the parts of each embodiment aforementioned. Such an embodiment belongs to this invention.

As the aforementioned, according to this invention, even in the case in which a beam spot passes through dust on an optical recording medium and an injury, the influence on a detecting operation of the number of crossing tracks and a crossing direction is reduced by the output of a portion without having dust in the beam spot and an injury, so that an information recording and/or reproducing apparatus without being affected by the dust and injury can be operated.

What is claimed is:

1. An optical information reproducing apparatus comprising:

an optical head having light irradiating means for irradiating a light beam through an optical system on an optical information recording medium wherein a plurality of tracks are provided parallel with each other so as to produce a beam spot illuminating said plurality of tracks and a light detecting means for detecting signals recorded in at least two different ones of said plurality of tracks by detecting light reflected from said optical information recording medium, said light detecting means producing an output;

light quantity detecting means receiving the output of said light detecting means, for detecting a total quantity of light reflected from a range extending over said plurality of tracks and producing an output for said light detecting means;

detecting means of a crossing track number and a crossing direction receiving the output of said light quantity detecting means, for detecting a number of crossing tracks where said beam spot crosses and a crossing direction where said beam spot crosses based on said output of said light quantity detecting means; and moving means for moving said beam spot in a track crossing direction crossing at least one track in accordance with the output from said detecting means of a crossing track number and a crossing direction;

wherein said light detecting means, said light quantity detecting means and said detecting means of a crossing track number and a crossing direction form a detecting arrangement which enables improved detection of signals from a plurality of tracks accurately despite the presence of dust or scratches at any one of said plurality of tracks.

2. The apparatus according to claim 1, wherein said optical information recording medium is formed as a card.

3. The apparatus according to claim 1, further comprising second moving means responsive to said light quantity detecting means, for moving said beam spot in a track direction in parallel with said track.

4. The apparatus according to claim 3, further comprising skew correcting means responsive to the output of said light quantity detecting means, for moving said optical information reproducing medium about an axis transverse to both said track crossing direction and said track direction, so that a moving direction in which said light spot is moved by said second moving means has a directional component which is perpendicular to said track direction.

5. The apparatus according to claim 3, wherein said second moving means is head moving means for moving said optical head in a parallel direction with said track.

6. The apparatus according to claim 1, wherein said light quantity detecting means is arranged corresponding to positions of said plurality of tracks and composed of a plurality of light detecting elements for reproducing information recorded in each track, respectively.

7. The apparatus according to claim 1, further comprising a plurality of light detecting elements arranged to receive reflected light from said optical information recording medium, said plurality of light detecting elements being capable of detecting a position deviation in said track crossing direction of said beam spot.

8. The apparatus according to claim 7, further comprising selecting means for selecting a pair of light detecting elements producing a position deviation signal showing a position deviation to said track crossing direction of said beam spot from said plurality of light detecting elements.

9. The apparatus according to claim 8, further comprising monitor means for monitoring output of the pair of light detecting elements producing said position deviation signal and controlling selection of said selecting means by output of said monitor means.

10. The apparatus according to claim 1, wherein said moving means is head moving means for moving said optical head.

11. The apparatus according to claim 1, wherein said light detecting means includes a first and second light detecting elements having changing quantity of received light in accordance with moving quantity of said beam spot moving in said track crossing direction, positions of said first and second light detecting elements having maximum and minimum quantity of received light are deviated each other.

12. The apparatus according to claim 11, wherein said detecting means of a crossing track number and a crossing direction calculates a moving direction where said beam spot moves in said track crossing direction and said crossing track number based on the output of said first and second light detecting elements.

13. The apparatus according to claim 11, wherein each position deviation of maximum quantity of received light of said first and second light detecting elements and of minimum quantity of received light of said first and second detecting elements is ¼ of a track pitch to said track crossing direction.

14. The apparatus according to claim 11, wherein said light detecting means includes two pairs of said first and second light detecting elements, said first and second light detecting elements forming each of the pairs are arranged in each position in front of and behind a focus position of said optical system, respectively.

15. The apparatus according to claim 14, further comprising focus position deviation signal producing means for producing a focus position deviation signal changing like an S-shape near a focus position from the output of said two pairs of first and second light detecting elements.

16. The apparatus according to claim 1, wherein said light detecting means includes a line sensor consisting of a plurality of light detecting elements linearly arranged so as to receive reflected light from a portion along said track crossing direction of said beam spot.

17. The apparatus according to claim 16, wherein the output of said detecting means of a crossing track number and a crossing direction changes in accordance with the moving quantity from a plurality of light detecting elements forming said line sensor to said track crossing direction of said beam spot and produces first and second signals in which positions of maximum output are deviated and positions of minimum output are deviated.

18. The apparatus according to claim 17, wherein said detecting means of a crossing track number and a crossing direction produces a cyclic signal corresponding to a cycle of said track crossing direction of said track from said first and second signals and calculates said crossing track number by counting the cyclic signal in a counting circuit.

19. The apparatus according to claim 1, wherein said light detecting means includes three pairs of light detecting elements receiving reflected light from portions extending over a plurality of tracks along said track crossing direction of said beam spot.

20. The apparatus according to claim 19, wherein said three pairs of light detecting elements are a pair of light detecting elements receiving reflected light along a perpendicular direction to said track and two pairs of light detecting elements receiving reflected light along a direction inclined to opposite direction with each other from said perpendicular direction, respectively.

21. The apparatus according to claim 1, wherein said light detecting means includes at least a pair of light detecting elements, said detecting means of a crossing track number and a crossing direction produces a signal having a different phase in accordance with a direction where said beam spot moves in said track crossing direction and calculates said direction from said phase.

22. An optical information reproducing apparatus comprising:

an optical head having light irradiating means for irradiating a light beam through an optical system on an optical information recording medium wherein a plurality of tracks are provided parallel with each other so as to produce a beam spot illuminating said plurality of tracks and a light detecting means for detecting signals recorded in at least two different ones of said plurality of tracks by detecting light reflected from said optical information recording medium, said light detecting means producing an output;

light quantity detecting means receiving the output of said light detecting means, for detecting a quantity of light for said light detecting means reflected from a range extending over said plurality of tracks and producing an output for said light detecting means;

detecting means of a crossing track number and a crossing direction receiving the output of said light detecting means, for detecting a number of crossing tracks where said beam spot crosses and a crossing direction where said beam spot crosses based on said output of said light detecting means and outputting a plurality of output signals read from respective ones of said plurality of tracks; and moving means for moving said beam spot in a track crossing direction crossing at least one track in accordance with the output from said detecting means of a crossing track number and a crossing direction;

wherein said moving means moves said beam spot using said plurality of signals read from said plurality of tracks;

wherein said light detecting means, said light quantity detecting means and said detecting means of a crossing track number and a crossing direction form a detecting arrangement which enables improved detection of signals from a plurality of tracks accurately despite the presence of dust or scratches at any one of said plurality of tracks.

* * * * *